US011539638B2

(12) United States Patent
Esmail et al.

(10) Patent No.: US 11,539,638 B2
(45) Date of Patent: Dec. 27, 2022

(54) VEHICLE NETWORK AND METHOD OF COMMUNICATION

(71) Applicant: Tesla, Inc., Austin, TX (US)

(72) Inventors: Adnan Esmail, Los Angeles, CA (US); Prashant Joshi, Santa Clara, CA (US); Sundar Balasubramaniam, Pleasanton, CA (US); Brijesh Tripathi, Los Altos, CA (US); Gaurav Chandra, Santa Clara, CA (US)

(73) Assignee: Tesla, Inc., Austin, TX (US)

( * ) Notice: Subject to any disclaimer, the term of this patent is extended or adjusted under 35 U.S.C. 154(b) by 164 days.

(21) Appl. No.: 16/659,374

(22) Filed: Oct. 21, 2019

(65) Prior Publication Data

US 2020/0127941 A1   Apr. 23, 2020

Related U.S. Application Data

(60) Provisional application No. 62/748,894, filed on Oct. 22, 2018.

(51) Int. Cl.
*H04L 47/80* (2022.01)
*H04J 3/16* (2006.01)
*H04L 47/722* (2022.01)
*H04L 67/12* (2022.01)
(Continued)

(52) U.S. Cl.
CPC .......... *H04L 47/805* (2013.01); *H04J 3/0652* (2013.01); *H04J 3/1694* (2013.01); *H04L 12/40163* (2013.01); *H04L 47/722* (2013.01); *H04L 67/12* (2013.01)

(58) Field of Classification Search
CPC ............. H04L 47/805; H04L 12/40163; H04L 47/722; H04L 67/12; H04L 47/801; H04J 3/0652; H04J 3/1694
See application file for complete search history.

(56) References Cited

U.S. PATENT DOCUMENTS

| 2003/0193924 A1* | 10/2003 | Gehring | H04W 72/0446 370/442 |
| 2005/0207370 A1* | 9/2005 | Harada | H04W 72/1263 370/321 |
| 2017/0201308 A1* | 7/2017 | Park | H04W 16/14 |

FOREIGN PATENT DOCUMENTS

DE          10197172 T5 *   7/2004   ............... H04J 3/00

OTHER PUBLICATIONS

DE-10197172-T5 (Google Translated) (Year: 2004).*

* cited by examiner

*Primary Examiner* — Chi H Pham
*Assistant Examiner* — Ji-Hae Yea
(74) *Attorney, Agent, or Firm* — Knobbe, Martens, Olson & Bear, LLP (57) ABSTRACT

A method of communication in a vehicle network is provided. An example method includes transmitting a network allocation map in a TDMA cycle, indicating reservation of time slots in the TDMA cycle. The method further includes transmitting a synchronization signal in the TDMA cycle, to synchronize the timing of nodes in the vehicle network. Each of the reserved time slots is identified by at least a network ID of a transmitting node in the vehicle network, and a slot type comprising one of a low latency traffic slot, and a bulk traffic slot. Further, the low latency traffic slots are repeated in the TDMA cycle at least as frequently as a guaranteed QoS latency parameter. Further, the bulk traffic slots are at least as long as a guaranteed QoS throughput parameter.

12 Claims, 4 Drawing Sheets

(51) Int. Cl.
*H04L 12/40* (2006.01)
*H04J 3/06* (2006.01)

VEHICLE NETWORK AND METHOD OF COMMUNICATION

CROSS-REFERENCE TO RELATED APPLICATIONS

This application claims priority to U.S. Prov. App. No. 62/748,894, which was filed on Oct. 22, 2018 and which is entitled "VEHICLE NETWORK AND METHOD OF COMMUNICATION," the contents of which is hereby incorporated herein by reference in its entirety.

Any and all applications for which a foreign or domestic priority claim is identified in the Application Data Sheet as filed with the present application are hereby incorporated by reference in their entirety under 37 CFR 1.57.

BACKGROUND

Technical Field

The present disclosure relates to a vehicle network and method of communication employed therein.

Description of Related Art

Traditional vehicular networks have a large number of point-to-point links between the vehicle computer and various vehicular subsystems. Typically, wiring harnesses for such a topology are inherently complex, and often difficult to install and troubleshoot. Modern vehicles have different categories of data traffic, such as sensor data, actuator and control signaling, as well as multimedia traffic. Sensor and control signaling typically requires low latency and has a low volume of data. Accordingly, sensor and control signaling data needs to be communicated more frequently, in smaller communication units (e.g. data packets or time slots). In contrast, data gathered from the sensors themselves, such as multimedia traffic, requires larger communication units (e.g. data packets or time slots) but may not be critical to the operation of the vehicle. Thus, multimedia traffic may be seen as low priority, bulk traffic. It is recommended that the different classes of communication traffic be differentiated from one another to ensure that each data traffic type meet quality of service (QoS) criteria, for proper operation of the vehicle systems.

Hence, there is a need for a vehicle communication network and communication method to alleviate these and other drawbacks of the state of the art.

DETAILED DESCRIPTION

The present disclosure relates to a vehicle onboard network system, and methods of communication deployed between the various components of the network. In some embodiments, the vehicle onboard network may enable transmission, and routing, of information from sensors, devices, modules, systems, processing elements, and similar components, located within a vehicle (herein referred to as 'nodes'). For example, a sensor may include a temperature sensor located within the vehicle. A temperature measured by this sensor may be transmitted via the vehicle onboard network to another location (e.g., a central processing system or a temperature control system). As another example, a sensor may be associated with a door of the vehicle. In this example, the sensor may indicate a position of the door (e.g., whether the door is closed or an angle of the door). The vehicle onboard network described herein may enable such transmission using decreased complexity as compared to prior techniques. Additionally, the vehicle onboard network may allow for higher transmission rates of other types of data as compared to prior techniques.

An example prior technique used to transmit information in a vehicle includes use of a controller area network (CAN) bus. The CAN bus may enable microcontrollers and devices to communicate, for example based on a message-based protocol, however it introduces technical deficiencies. For example, a CAN bus only operates at data transmissions rates that may not be acceptable for modern vehicles needing to communicate at high speed to control various components. In this example, data transmission rates on a CAN bus may be limited to 1 megabit per second. Additionally, there are substantial wiring and processing complexities associated with use of the CAN bus.

A vehicle onboard network described herein allows for higher data transmission rates than a CAN bus while advantageously reducing wiring complexity. In some embodiments, an improved bus may be used which is shareable between a multitude of nodes. For example, the improved bus may be shareable by a subset, or all, of the nodes included in a vehicle. In this example, the improved bus may be shareable between nodes included in a same group of nodes (e.g., a domain as described below). To ensure that the improved bus is being efficiently used, the vehicle onboard network may use time division multiple access (TDMA) techniques. In some embodiments, a network allocation map may be used to inform times at which a node can transmit information via the improved bus. As will be described, the network allocation map may comprise TDMA slot reservations assignable to nodes. Thus, the vehicle onboard network may allow for the timely, and reliable, transmission of information from multitudes of nodes.

Advantageously, additional nodes may be rapidly added to the improved bus to enhance a vehicle over time. For example, a sensor may be added to a vehicle which is usable to inform safety associated with seatbelts. In this example, the sensor may be communicatively coupled to the improved bus and its information transmitted using the TDMA network described herein. For example, the sensor may transmit information according to a network allocation map which is shared amongst other nodes communicatively coupled to the improved bus.

In this way, the complexity associated with sharing a bus of one or more electrical connections (e.g., wires) may be reduced through the above-described TDMA slot reservations. For example, since use of the improved bus may be controlled, at least in part, using a network allocation map, an improved bus may more simply be formed using a threshold number of wires (e.g., 4, 6, and so on). These wires may then be routed throughout a vehicle or throughout a particular domain of the vehicle. Thus, wiring and processing complexity may be reduced as compared to more complex prior techniques.

As described above, the vehicle onboard network according to various embodiments of the present invention may be a time division multiple access (TDMA) network. Data over the TDMA vehicle onboard network is transmitted in data packets having time slots of predetermined, fixed durations. Nodes in the vehicle onboard network are synchronized to a central clock. Such a synchronous, reserved TDMA communication scheme allows guaranteed QoS communications, avoiding packet collisions, and competing transmissions in the same time slots.

Figure 1:
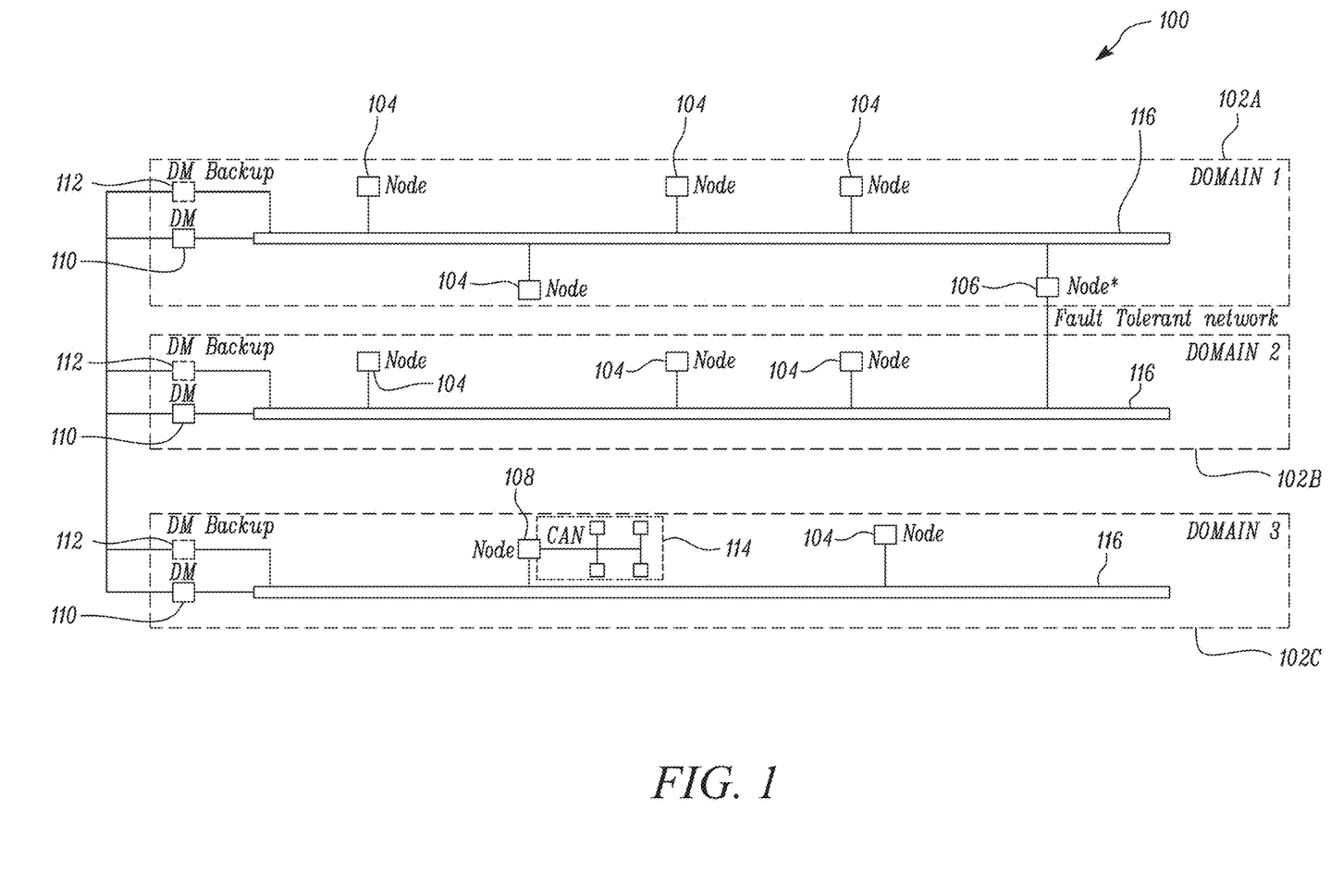
FIG. 1 illustrates a vehicle communication network according to certain embodiments.

FIG. 1 illustrates a vehicle communication network 100 according to certain embodiments. The vehicle communication network 100 is organized into a number of domains 102A, 102B, and 102C. Each domain 102 may represent a logical grouping of several communication nodes which provides an improved bus for transferring data within a vehicle. For example, one scheme of logical grouping in a vehicle may be grouping nodes according to vehicle component location such as, but not limited to, vehicle front left, vehicle front right, vehicle cabin left side, vehicle cabin right side, vehicle trunk, and so forth. Another example logical grouping may be according to vehicle subsystem (e.g., air conditioning, temperature, certain safety systems, exterior lighting, interior lighting, and so on). Other schemes of logical groupings to form domains in the vehicle communication network 100 are also envisioned and fall within the scope of the present disclosure. Multiple domains 102 may be connected to each other using bridging methods for data networks.

Each domain 102 includes one or more nodes 104. Each node 104 may be a vehicle module which communicates with other modules in the vehicle. Examples of vehicle modules include, doors, seats, battery pack, front end module, front subframe module, rear subframe module, and so forth. Each module may include various sensors, and/or actuators—for example, impact sensors, pressure sensors, temperature sensors, wheel speed sensors, airbag inflators, HVAC systems, traction power electronics, and so forth.

Some nodes may be critical to the safe operation of the vehicle, such as airbag systems, traction power electronics, vehicle stability systems, and the like. Such nodes, such as node 106 may be connected in a fault tolerant configuration, having a physical connection with two separate domains. This configuration provides failover capability in the event that the node 106 may not be able to communicate with the other vehicle systems, over one domain.

Some nodes 108 may also include layered subnets, comprising further child nodes, which may communicate with node 108 transparent to the vehicle communication network 100. Such a layered subnet may be beneficial, for example, to group modules in a particular vehicle location, such as various sensors and electronics in the door. Typically, such a layered subnet may be deployed, for example, in vehicle modules that do not communicate often, or only communicate data less than the minimum data time slot available in the vehicle communication network 100.

Each domain may have one domain master 110, and a backup domain master 112. The domain master 110 is a special type of node for managing the communication resources in the vehicle communication network 100 and may implement medium access control (MAC) protocol. The backup domain master 112 has identical, or near identical, capabilities compared to the domain master 110, and is designated as a failover node, in the event that a domain master 110 fails.

The nodes 104, 106, 108, domain master 110, and backup domain master 112, are all interconnected over a single physical conductive medium 116 within the domain. In various embodiments, the single physical conductive medium 116 may be vehicle DC power delivery conductors. For example, the vehicle communication network 100 may be implemented as a power line communication (PLC) network. In this example, the network 100 may be provided via power connections within the vehicle (e.g., DC power connections).

Each node 104, 106, and 108 includes various vehicle sensors and actuators, and a modem for communicating with the other nodes over the vehicle communication network 100.

Figure 2:
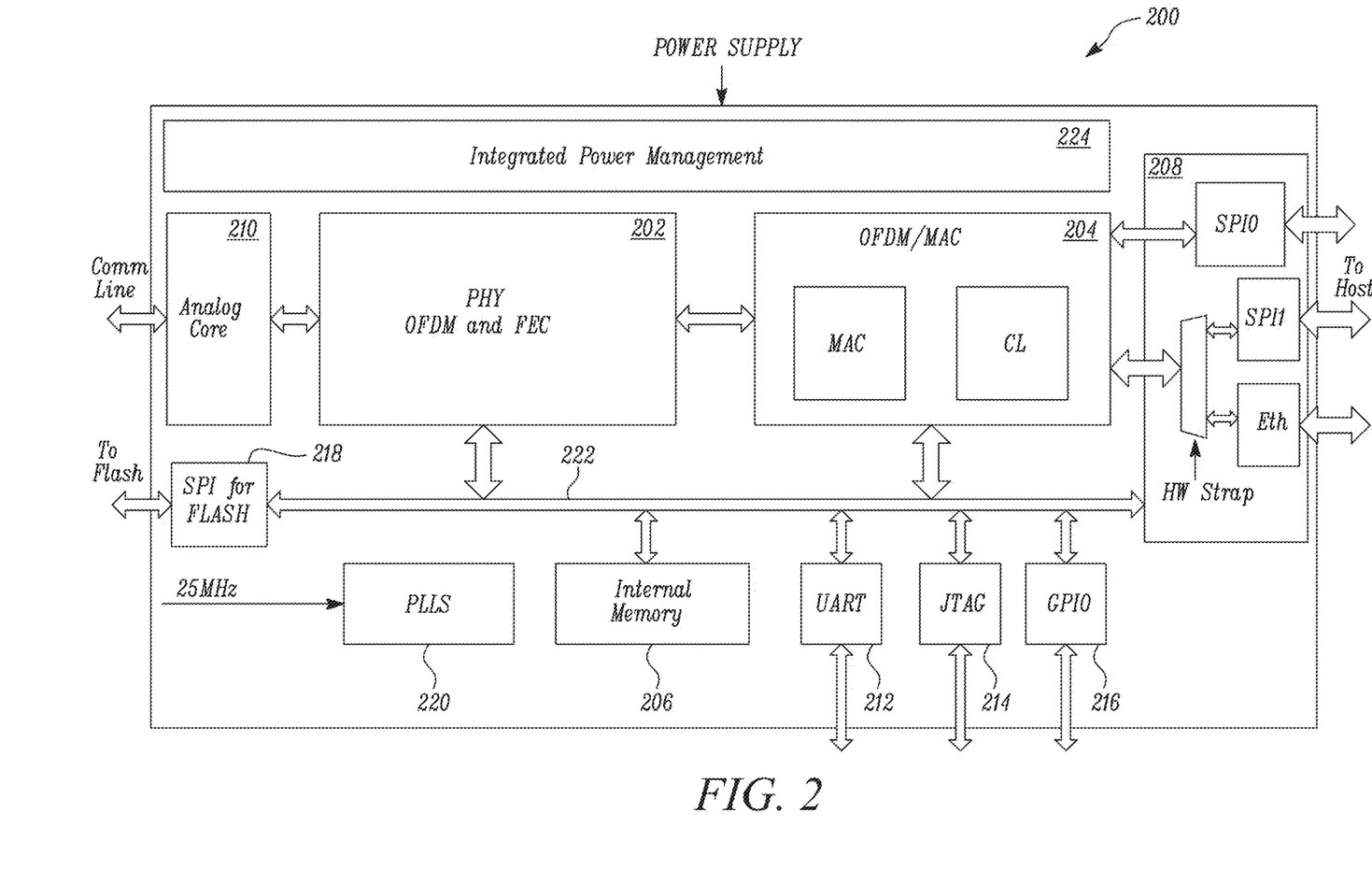
FIG. 2 illustrates a functional block diagram of a modem used in the vehicle communication network, according to certain embodiments.

FIG. 2 illustrates a functional block diagram of a modem 200 used in the vehicle communication network 100, according to certain embodiments. The modem 200 supports two categories of traffic: a low latency traffic, which typically has low throughput (for example, not exceeding 1 Mbps), and a low latency guarantee (for example, 500 microseconds or less); and a high throughput traffic (for example, 50 Mbps), with a lower latency requirement (for example, 40 milliseconds). In other embodiments, the modem 200 supports three or more categories of traffic.

The modem 200 includes a physical layer processor 202, a MAC processor 204, an internal memory 206, and various interfaces. The interfaces include a host interface 208, a comm. analog core 210, Universal Asynchronous Receiver Transmitter (UART) 212, a Joint Test Action Group (JTAG) interface 214, a general purpose I/O (GPIO) interface 216, and a flash interface 218. The modem 200 also includes a phase locked loop (PLL) module 220, for synchronizing the modem timing with a central clock. The various processors and interfaces of the modem communicate with each other over a common bus fabric 212. The modem includes an integrated power management module 214, which provides the power to the various processors and interfaces of the modem.

The physical layer processor 202 may be an OFDM processor according to various embodiments. The physical layer processor 202 may include, for example, an Inverse Fast Fourier Transform (IFFT) module and a forward error correction (FEC) module. In various embodiments, the OFDM processor operates in a passband channel of 2 MHz to 50 MHz. However, other channels are also envisioned depending on the designed network throughput and channel loss.

In one embodiment, the physical layer processor 202 supports low latency packets, for which the payload is encoded in the packet header. Such low latency packets are typically small in size. An exemplary low latency packet includes 16 bytes or 32 bytes of payload data, and 3 bytes for source ID, destination ID, and packet type field. In the exemplary channel of 2 MHz to 50 MHz, the example 35-byte low latency packet may require a time slot smaller than or equaling 25 microseconds.

The MAC processor 204 handles the MAC layer processing of the communications. The MAC processor 204 may include a MAC layer processing unit and a cross layer processing unit. The MAC processor 204 may implement a TDMA based MAC layer. In various embodiments, the MAC processor 204 is configured to operate in a lean mode, wherein multiple physical layer frames from different nodes 104 can be assembled with minimal MAC overhead. To further improve latency performance, the MAC processor 204 may support transmission of data frames with and without an acknowledgement mechanism (e.g. ACK responses). In embodiments where ACK responses are required for transmissions, the ACK frame may be designed to be short, such as 2 OFDM symbols, for example.

In various embodiments, the MAC processor 204 may have specialized hardware to support low latency communication packets, thus further improving the latency parameters for the low latency traffic.

The internal memory 206 may include an SRAM memory or a DRAM memory. The internal memory 206 is the primary memory for various operations and data buffering for the physical layer processor 202, and the MAC processor 204. The internal memory 206 may also include a flash memory for saving persistent data, such as the TDMA network allocation maps, for example. In embodiments, the internal memory 206 is a flash memory. The internal memory 206 may store a network ID of the node of which modem 200 is a part. The network ID of the node of which modem 200 is a part, may be transmitted by the host controller (or hub), at the time of initial setup, or reconfiguration.

The host interface 208 may include a Serial Peripheral Interface (SPI) for communicating with a central host controller (not illustrated; also referred to as the hub, herein). In embodiments, the host interface 208 may be used by the host to signal TDMA network allocations maps to the modem 200, and for pushing firmware updates to the modem 200. The host interface 208 may include dual SPI-SPI0 and SPI1. In some embodiments, the dual interfaces may be deployed as redundant interfaces for failover modes. In other embodiments, the dual interfaces may be deployed as supplementary interfaces, such that SP0 is the primary interface, and SP1 may be used for additional traffic, when required.

The host interface 208 may also include an ethernet interface, implemented using a reduced gigabit media independent interface (RGMII). The RGMII ethernet interface may thus allow coupling of the MAC processor 204 with an external physical layer ethernet chip (not illustrated), independent of the medium (e.g. twisted pair, or coaxial, or fiber optic, and the like).

The comm. analog core 210 is a front-end module for coupling with the external network cables or conductors (illustrated as comm. line in FIG. 2). In some embodiments, the comm. analog core 210 conforms to the Power Line Communication (PLC) communication standard. The comm. analog core 210 may support differential signaling, or single ended signaling, or both with the ability to configure the signaling mode. For example, the modem 200 may be able to switch between a differential signaling mode and a single ended signaling mode based on whether the modem is transmitting/receiving a low latency data packet, or a high throughput bulk data packet, or based on the line conditions of the network cable/conductor.

In some embodiments, the comm. analog core 210 may couple to an external line driver. In other embodiments, the comm. analog core 210 may include the line drivers, such that no external hardware is required to amplify the signals further. Further, termination resistors may either be integrated into the comm. analog core 210 or may be connected externally to the comm. analog core 210.

The modem 200 may also leverage other interfaces, such as UART 212, JTAG 214, and GPIO 216 for testing and debugging purposes.

Flash interface 218 may be used for flashing persistent data for the modem 200. Such persistent data may include TDMA network allocation maps, configuration information for analog core 210, and so forth. The flash interface 218 may be an SPI in accordance with one embodiment. The flash interface 218 may be communicably coupled to the host controller (or hub), or to an external port for connecting a flash programming tool, or both.

The modem 200 also includes one or more PLLs 220. The PLL 220 is configured to maintain synchronization with the host controller (or hub), and consequently with all other nodes 104 of the vehicle communication network 100. In some embodiments, the PLL 220 may receive a fixed frequency clock signal, such as a 25 MHz clock signal, from the host controller (or hub) to maintain the timing synchronization by adjusting a timing circuitry of the node, based on the received synchronization signal.

The various processors, interfaces, and memory for the modem 200 may be communicably coupled to one another via a bus fabric 222. In some embodiments, the modem 200 may communicate via the bus fabric 222 at particular times. For example, the modem 200 may use the network allocation map to provide information via the bus fabric 222.

The integrated power management module 224 is a power controller for providing power to the various processors, interfaces, and memories of the modem 200. The integrated power management module 224 may also provide control signals to switch the modem 200 to a power saving mode, or a sleep mode when required.

In some embodiments, a modem 200 may receive a network allocation map in a TDMA cycle, and identify from the network allocation map, particular time slots reserved for transmission by the associated node. The modem 200 may access the internal memory 206, and compares a received network ID to the one stored in memory 206 to identify whether the TDMA time slot has been assigned to itself.

The modem 200 buffers the data to be transmitted beforehand, and at the identified time slot reservation, the modem 200 transmits the buffered data.

If a modem 200 does not identify a time slot reservation for transmission by its node, the modem excludes itself from transmitting the buffered data. This implementation may be helpful for isolating faults, and bringing faulty nodes offline, so as not to interfere with the operation of the rest of the nodes in the vehicle.

Figure 3:
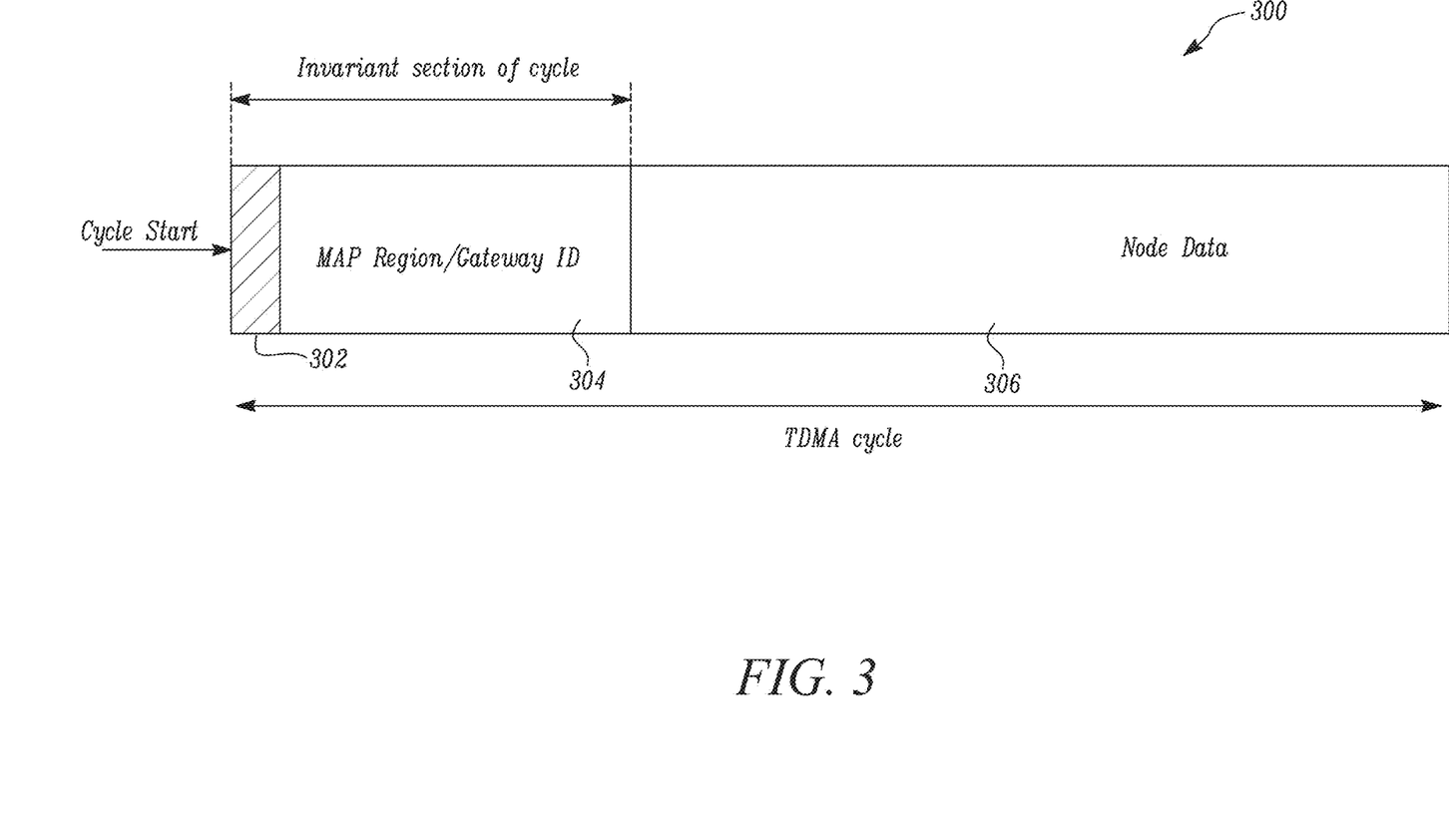
FIG. 3 illustrates a logical TDMA cycle structure, according to certain embodiments.

FIG. 3 is a logical representation of an exemplary TDMA cycle 300 to be employed in various embodiments. The TDMA cycle may include a cycle start indicator 302, a MAP region 304, and a portion for node data 306. The cycle start indicator 302, and the MAP region 304 together form the invariant section of the cycle and repeat exactly for every TDMA cycle 300 transmitted in the vehicle communication network 100.

The cycle start indicator 302 is a fixed symbol indicating the beginning of the TDMA cycle 300. The cycle start indicator may be known to all nodes 104 such that the nodes 104 can easily detect the start of a TDMA cycle 300. The cycle start indicator 302 may also function as a failsafe for ensuring synchronization of the nodes 104 (e.g. modems 200) with the host controller (or hub). If a node 104 (or modem 200) does not detect the known TDMA cycle start indicator 302 at its designated time slot, the modem 200 may ascertain that it is out of synchronization with the host controller (or hub), and may initiate a synchronization procedure to regain synchronization with the host controller (or hub).

The MAP region 304 allocates TDMA time slots for the entire TDMA cycle 300. The MAP region 304 includes a TDMA network allocation map, and a gateway ID supplied by the host controller (or hub). The TDMA network allocation map reserves the TDMA time slots in the region for node data 306, for nodes 104 to communicate with one another over the vehicle communication network 100. The TDMA network allocation map defines which pair of nodes communicates in a given TDMA time slot, the type of traffic of the TDMA time slot (whether for low latency traffic, or for high throughput bulk traffic), and the duration for the TDMA time slot allocation.

According to various embodiments of the present invention, a host controller or hub reserves TDMA time slots for various nodes 104 in the vehicle communication network 100. The host controller or hub then transmits the TDMA time slot allocation to all the nodes 104 in the network, using a network allocation map.

A network allocation map comprises TDMA slot reservations, wherein each of the reserved time slots is identified by a network ID of a transmitting node 104, a network ID of a receiving node, a slot type indicating whether the TDMA time slot allocation is a low latency traffic slot, or a bulk traffic slot, and a duration of the TDMA time slot allocation. The duration of the TDMA time slot allocation indicates the number of contiguous time allocation periods to be used for sending data from a source Node to a destination Node (e.g., via a bus, such as a common bus).

The low latency traffic slot slots are repeated in the TDMA cycle at least as frequently as a guaranteed QoS latency parameter. The high throughput bulk traffic slots are at least as long as a guaranteed QoS throughput parameter.

Network allocation maps may be in a binary format, in accordance with various embodiments. In one embodiment, the maximum size of network allocation maps may be 4,800 bytes or fewer. The network allocation maps may also include a map ID, which indicates which particular one of several network allocation maps is being used. To switch maps, the host controller may simply transmit a map ID instead of the complete network allocation map.

To reduce network allocation map size, the vendor may choose to partition the map so that low latency slots, which repeat every 500 μs, are specified only once in the map. Network allocation maps may also include a mechanism for modem 200 that receives it to validate the integrity of the received network allocation map.

The map region 304 is also invariant within the TDMA cycle 300. This allows nodes 104 to join the vehicle communication network 100 at any given point, since the nodes 104 know a priori where the TDMA network allocation map is located with respect to the beginning of the TDMA cycle 300.

The map region 304, although illustrated as a contiguous group of TDMA time slots in the logical representation of the TDMA cycle 300, in a physical implementation, the map region 304 may occupy TDMA time slots distributed throughout a physical TDMA cycle.

The region for node data 306 comprises TDMA slots for data communication by the nodes 104. The node data 306 includes low latency slots, as well as high throughput bulk data slots.

An example arrangement of the node data 306 is described in conjunction with FIG. 4 below.

Figure 4:
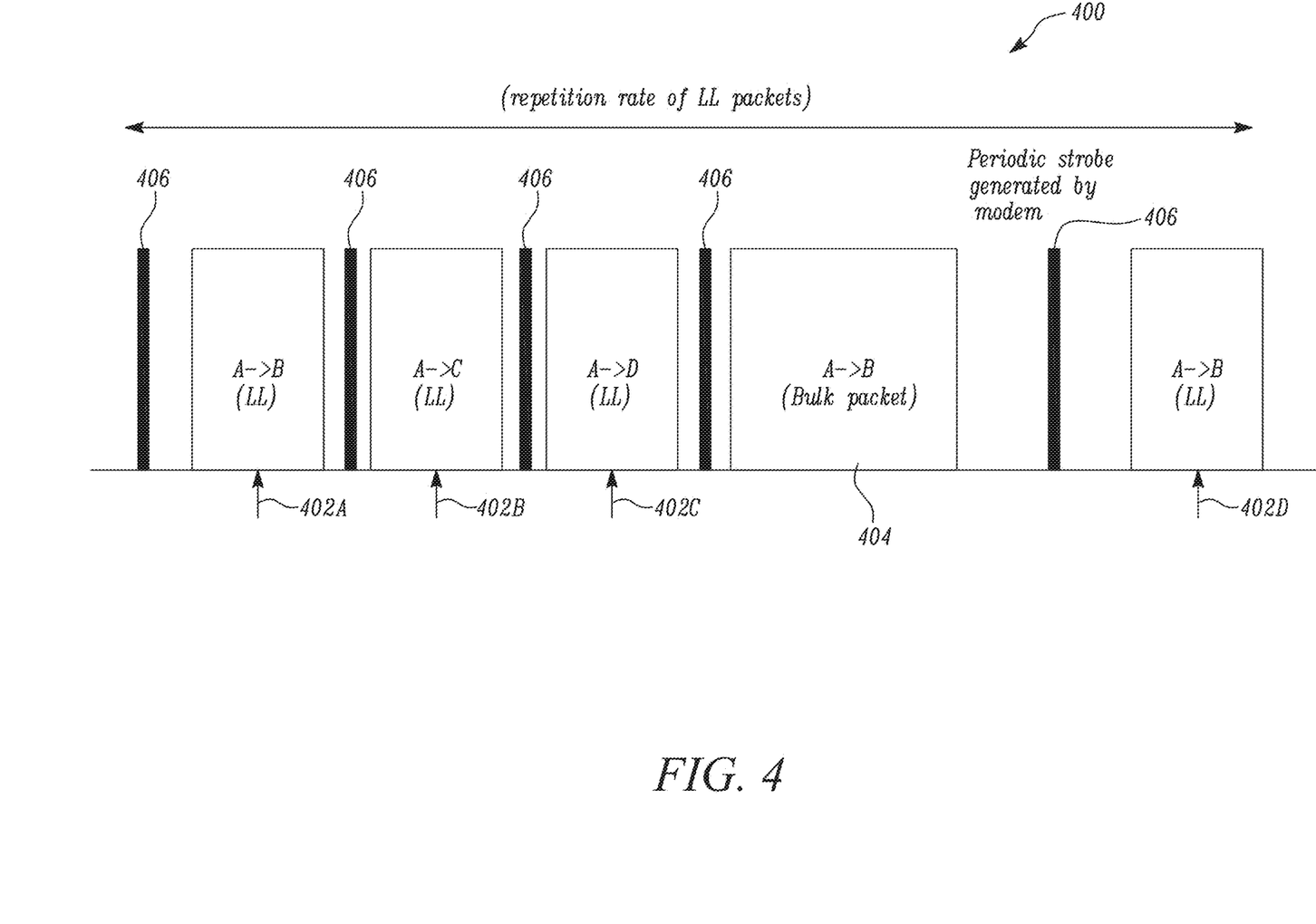
FIG. 4 illustrates a physical TDMA cycle structure, according to certain embodiments.

FIG. 4 represents a part 400 of a physical TDMA cycle. The part 400 may be referred to as a mini-cycle 400. The physical TDMA cycle may be constituted of a large number of such mini-cycles 400. In one example embodiment, a mini-cycle 400 may be of 500 microseconds duration, and a physical TDMA cycle may be made of 80 such mini-cycles 400, for a total of a 40 millisecond TDMA cycle.

The mini-cycle 400 includes low latency slots 402A, 402B, 402C, and 402D, high throughput bulk data slots 404, and a number of strobe signals 406.

The low latency slots are time slots having short duration (for example, 25 microseconds or less), high repetition (for example, repeated once every 500 microseconds), since the low latency packets are required to exhibit a guaranteed maximum latency. In other words, in this example implementation, the low latency slots guarantee a maximum latency of 500 microseconds before the same pair of nodes may communicate a second time.

The high throughput bulk data slots are time slots having a longer duration (for example, 37.5 microseconds), carry a larger amount of data per time slot (for example, 112 bytes of node data). However, the high throughput bulk data slots are only repeated less frequently (for example, once every 40 milliseconds), since a higher latency is tolerable for the high throughput traffic.

The strobe signals 406 may be used by the modem 200 for performing automatic gain control.

What is claimed is:

1. A method of communication in a vehicle network, the method comprising:
    transmitting a network allocation map in a TDMA cycle, indicating reservation of time slots in the TDMA cycle; and
    transmitting a synchronization signal in the TDMA cycle, to synchronize the timing of nodes in the vehicle network;
    wherein each of the reserved time slots is identified by at least a network ID of a transmitting node in the vehicle network, and a slot type comprising one of a low latency traffic slot, and a bulk traffic slot, wherein the low latency traffic slot has a first latency guarantee of 500 microseconds or less and wherein the bulk traffic slot has a second latency guarantee of 40 milliseconds or less;
    wherein the low latency traffic slots are repeated in the TDMA cycle at least as frequently as a guaranteed QoS latency parameter; and
    wherein the bulk traffic slots are at least as long as a guaranteed QoS throughput parameter.

2. The method of claim 1, wherein the low latency traffic slots are repeated every 500 microseconds.

3. The method of claim 1, wherein the low latency traffic slots are grouped together, and the group of low latency traffic slots is repeated every 500 microseconds.

4. The method of claim 1, wherein the length of bulk traffic slots is greater than the length of the low latency traffic slots.

5. The method of claim 1, wherein the bulk traffic slots are repeated once every TDMA cycle.

6. A system for communicating in a vehicle network, the system comprising:
    a plurality of segments of equal duration within a TDMA network;
    each of the plurality of segments further comprising a plurality of TDMA communication slots and the slots and segments forming a TDMA cycle;
    at least some of the plurality of communication slots supporting communication between a pair of nodes in the vehicle network;
    wherein the plurality of communication slots supporting communication between the pair of nodes in the vehicle network, is identified by a slot type comprising one of a low latency traffic slot, a bulk traffic slot, wherein the low latency traffic slot has a first latency guarantee of 500 microseconds or less and wherein the bulk traffic slot has a second latency guarantee of 40 milliseconds or less; and wherein the low latency traffic slots are repeated in each of the plurality of segments and the bulk traffic slots are repeated at least in each TDMA cycle.

7. The system of claim 6 further comprising network allocation map slots, comprising a network allocation map, the network allocation map further comprising identification of each of the communication slots by at least one of:
   a slot type comprising one of a low latency traffic slot, a bulk traffic slot; a network allocation map slot, a modem synchronization slot, or a probe slot;
   network ID of a transmitting node;
   network ID of a receiving node; or
   length of the communication slot.

8. The system of claim 6, wherein the low latency traffic slots, and bulk traffic slots are further identified by at least a network ID of a transmitting node.

9. The system of claim 6, wherein the duration of segments is 500 microseconds.

10. The system of claim 6, wherein the low latency traffic slots are grouped together, and the group of low latency traffic slots is repeated in each of the plurality of segments.

11. The system of claim 6, wherein the length of bulk traffic slots is greater than the length of the low latency traffic slots.

12. The system of claim 6, wherein the length of the low latency traffic slots, and bulk traffic slots sorts are defined in a network allocation map.

* * * * *

UNITED STATES PATENT AND TRADEMARK OFFICE
CERTIFICATE OF CORRECTION

PATENT NO. : 11,539,638 B2
APPLICATION NO. : 16/659374
DATED : December 27, 2022
INVENTOR(S) : Adnan Esmail et al.

Page 1 of 1

It is certified that error appears in the above-identified patent and that said Letters Patent is hereby corrected as shown below:

In the Claims

In Column 9, Claim 12, Line 26, after "slots" delete "sorts".

Signed and Sealed this
Twenty-fourth Day of October, 2023

Katherine Kelly Vidal
*Director of the United States Patent and Trademark Office*